United States Patent
McLauchlan et al.

(10) Patent No.: US 11,999,225 B2
(45) Date of Patent: Jun. 4, 2024

(54) PRESSURE RELIEF ASSEMBLY AND A VALVE ASSEMBLY THAT USES THE PRESSURE RELIEF ASSEMBLY

(71) Applicant: Eaton Intelligent Power Limited, Dublin (IE)

(72) Inventors: Raymond Bruce McLauchlan, Macomb Township, MI (US); Eugene Francis Moody, II, Holly, MI (US); Pramod Dnyaneshwar Jadhav, Maharashtra (IN); Robert Boychuk, Rochester Hills, MI (US); Sascha Hermann, Sinzheim (DE); Mustafa Huseyin, Karlsruhe (DE)

(73) Assignee: Eaton Intelligent Power Limited, Dublin (IE)

( * ) Notice: Subject to any disclaimer, the term of this patent is extended or adjusted under 35 U.S.C. 154(b) by 261 days.

(21) Appl. No.: 17/428,805

(22) PCT Filed: Feb. 10, 2020

(86) PCT No.: PCT/EP2020/025058
§ 371 (c)(1),
(2) Date: Aug. 5, 2021

(87) PCT Pub. No.: WO2020/164805
PCT Pub. Date: Aug. 20, 2020

(65) Prior Publication Data
US 2022/0126683 A1    Apr. 28, 2022

(30) Foreign Application Priority Data
Feb. 11, 2019 (IN) .............................. 201911005283

(51) Int. Cl.
*B60K 15/035* (2006.01)
*B60K 15/03* (2006.01)

(52) U.S. Cl.
CPC .................. *B60K 15/03519* (2013.01); *B60K 2015/0321* (2013.01); *B60K 2015/03296* (2013.01);
(Continued)

(58) Field of Classification Search
CPC ...... B60K 15/03519; B60K 2015/0321; B60K 2015/03296; B60K 2015/03467;
(Continued)

(56) References Cited

U.S. PATENT DOCUMENTS 4,840,195 A * 6/1989 Zabrenski .............. G05D 16/10
                                                         137/557
5,341,839 A * 8/1994 Kobayashi ................ E03D 5/10
                                                        137/614.19
(Continued)

FOREIGN PATENT DOCUMENTS

WO    2019206460 A1    10/2019

OTHER PUBLICATIONS

International Search Report for International Application No. PCT/EP2020/025058; dated Jul. 10, 2020; 5 total pages.

*Primary Examiner* — Patrick C Williams
(74) *Attorney, Agent, or Firm* — Baker Botts L.L.P.

(57) ABSTRACT

A pressure relief assembly includes a plurality of valve components and a cap configured to house the valve components. The cap includes a ring having a retaining portion. The pressure relief assembly includes a sensor apparatus coupled to the cap via the ring. The sensor apparatus is configured to sense whether a predetermined pressure threshold is reached. The valve components operate to relieve pressure when the predetermined pressure threshold is reached. The sensor apparatus includes a retaining portion engaging the retaining portion of the ring. A valve assembly includes a first valve apparatus and the pressure relief assembly configured to bypass the first valve apparatus. The
(Continued)

valve assembly includes a main housing that surrounds the first valve apparatus and the pressure relief assembly. The main housing defines an aperture in which the cap of the pressure relief assembly is at least partially disposed in the aperture.

19 Claims, 12 Drawing Sheets

(52) U.S. Cl.
CPC ............... *B60K 2015/03467* (2013.01); *B60K 2015/03585* (2013.01); *B60Y 2400/306* (2013.01); *B60Y 2410/10* (2013.01); *B60Y 2410/113* (2013.01)

(58) Field of Classification Search
CPC ........... B60K 2015/03585; B60K 2015/03302; B60K 2015/03514; B60Y 2410/10; B60Y 2410/113

See application file for complete search history.

(56) References Cited

U.S. PATENT DOCUMENTS

| | | | |
|---|---|---|---|
| 5,664,759 A * | 9/1997 | Evans | F16K 27/003 251/63.5 |
| 6,186,177 B1 * | 2/2001 | Maher | F17D 1/04 137/884 |
| 10,294,836 B2 * | 5/2019 | Asakura | F01M 1/20 |
| 2008/0190486 A1 * | 8/2008 | Lazzara | F16K 17/04 137/467 |
| 2017/0138316 A1 | 5/2017 | Wada | |
| 2017/0260932 A1 | 9/2017 | Brock et al. | |
| 2017/0274760 A1 | 9/2017 | Mihara | |
| 2018/0057355 A1 * | 3/2018 | Osawa | G01L 19/003 |
| 2018/0370351 A1 | 12/2018 | Vulkan et al. | |

* cited by examiner

PRESSURE RELIEF ASSEMBLY AND A VALVE ASSEMBLY THAT USES THE PRESSURE RELIEF ASSEMBLY

CROSS-REFERENCE TO RELATED APPLICATIONS

This application is a U.S. National Phase application under 35 U.S.C. § 371 of International Application No. PCT/EP2020/025058, filed on Feb. 10, 2020, which claims the benefit under 35 U.S.C. 0 119l(a) of Indian Application No. 201911005283, filed on Feb. 11, 2019, which are hereby incorporated by reference in their entirety.

TECHNICAL FIELD

The present teachings generally include a pressure relief assembly and a valve assembly that uses the pressure relief assembly.

BACKGROUND

A fuel tank may include a valve that functions to vent vapors from a fuel tank. Generally, the vapors are vented to a canister that stores the vapors and is periodically purged.

SUMMARY

The present teachings generally provide a pressure relief assembly including a plurality of valve components and a cap configured to house the valve components. The cap includes a ring having a retaining portion. The pressure relief assembly includes a sensor apparatus coupled to the cap via the ring. The sensor apparatus is configured to sense whether a predetermined pressure threshold is reached. Generally, the valve components operate to relieve pressure when the predetermined pressure threshold is reached. The sensor apparatus includes a retaining portion engaging the retaining portion of the ring.

The present teachings also generally provide a valve assembly including a first valve apparatus and a pressure relief assembly configured to bypass the first valve apparatus. The valve assembly includes a main housing that surrounds the first valve apparatus and the pressure relief assembly. The main housing defines an aperture. The pressure relief assembly includes a plurality of valve components and a cap configured to house the valve components. The cap is at least partially disposed in the aperture, and the cap includes a ring having a retaining portion. The pressure relief assembly includes a sensor apparatus coupled to the cap via the ring. The sensor apparatus is configured to sense whether a predetermined pressure threshold is reached in the main housing. The valve components operate to relieve pressure through the valve components housed in the cap when the predetermined pressure threshold is reached. The sensor apparatus includes a retaining portion engaging the retaining portion of the ring.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
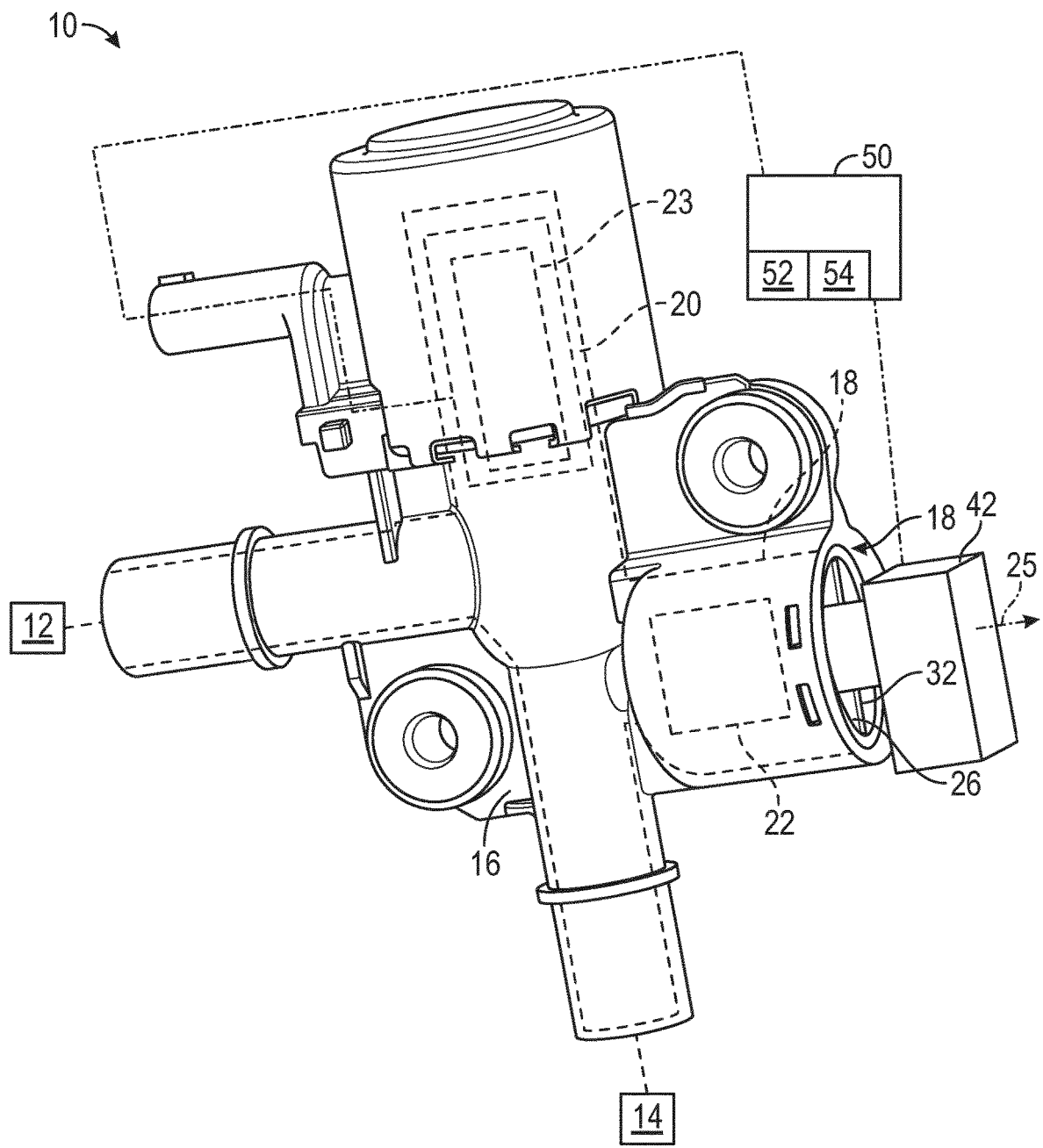
FIG. 1 is a schematic perspective view of a valve assembly that includes a pressure relief assembly and a generic sensor apparatus shown coupled to the pressure relief assembly.

Referring to the Figures, wherein like numerals indicate like or corresponding parts throughout the several views, a valve assembly 10 is generally shown in FIG. 1. In certain applications, the valve assembly 10 may be utilized with a tank 12, such as a fuel tank 12 of a vehicle. Therefore, liquid fluid, such as fuel may be stored in the tank 12. It is to be appreciated that the valve assembly 10 may be utilized with tanks 12 other than fuel tanks 12, and other liquid fluids may be stored in the tank 12.

The vehicle that may use the valve assembly 10 may be a hybrid vehicle, but other types of vehicles may be used instead. Generally, a hybrid vehicle includes an engine, such as an internal combustion engine and at least one electric motor. The engine may provide torque to a transmission, a drive train, etc., to ultimately drive wheels of the vehicle to propel the vehicle. The electric motor may also provide torque to ultimately drive the wheels of the vehicle. The hybrid vehicle may have different modes of operation depending on the driving conditions. For example, the engine and the electric motor may both operate together to drive the wheels, and as another example, the engine may operate alone to drive the wheels or the electric motor may operate alone to drive the wheels. The valve assembly 10 may be further defined as a fuel tank 12 isolation valve (FTIV) when being used in the hybrid vehicle.

When the vehicle is operating in an electric mode, the engine is off and no fuel is being delivered to the engine. The fuel system from the tank 12 to the engine is pressurized with vapors when the vehicle is in the electric mode due to the fuel system being a closed system. Therefore, vapor pressure may be relieved via the valve assembly 10 when the vehicle is in the electric mode.

Generally, the valve assembly 10 may allow vapors that build up in the tank 12 to be vented out of the tank 12 to a vapor control structure 14. The valve assembly 10 may also prevent excess vapor pressure build up in the valve assembly 10 and/or the tank 12 during certain modes. The vapor control structure 14 may store the vapor received from the tank 12 and may be periodically purged. Therefore, under certain conditions, the vapors move or flow from the tank 12 through the valve assembly 10 and into the vapor control structure 14. It is to be appreciated that the vapor control structure 14 may be referred to as a canister, such as a charcoal canister.

Referring to FIG. 1, the valve assembly 10 includes a main housing 16 adapted to be directly or indirectly coupled to the tank 12 or any other suitable component of the vehicle. The main housing 16 may define an aperture 18, which will be discussed further below.

The main housing 16 may contain various valve pieces to vent the tank 12 and/or prevent excess vapor pressure build up in the tank 12. For example, the valve assembly 10 may include a first valve apparatus 20 (see FIG. 1, shown schematically as a dashed box) and a pressure relief assembly 22 (see FIG. 1, shown schematically as a dashed box) configured to bypass the first valve apparatus 20. The first valve apparatus 20 and the pressure relief assembly 22 are spaced from each other. The main housing 16 may surround the first valve apparatus 20 and the pressure relief assembly 22, and the pressure relief assembly 22 may operate to vent vapors while the vapors bypass the first valve apparatus 20.

The first valve apparatus 20 may include a plurality of valve components 23 that operate to allow the vapors that build up in the tank 12 to be vented to the vapor control structure 14. For example, the first valve apparatus 20 may allow the vapors to vent when the tank 12 is being filled with fuel.

The pressure relief assembly 22 may include a plurality of valve components 24 (see FIG. 2) disposed along a central axis 25, and these valve components 24 may operate to bypass the first valve apparatus 20 when a predetermined pressure threshold is reached in the main housing 16. The predetermined pressure threshold may be any suitable pressure based on engineering requirements, government requirements, etc. Therefore, the pressure relief assembly 22 provides a way to bleed off excess vapors that build up in the tank 12. Generally, the pressure relief assembly 22 operates to relieve vapor pressure in the tank 12 when the fuel system is pressurized. For example, the pressure relief assembly 22 may operate to relieve pressure when the vehicle is in the electric mode. As such, the first valve apparatus 20 and the pressure relief assembly 22 may operate for different reasons.

Figure 2:
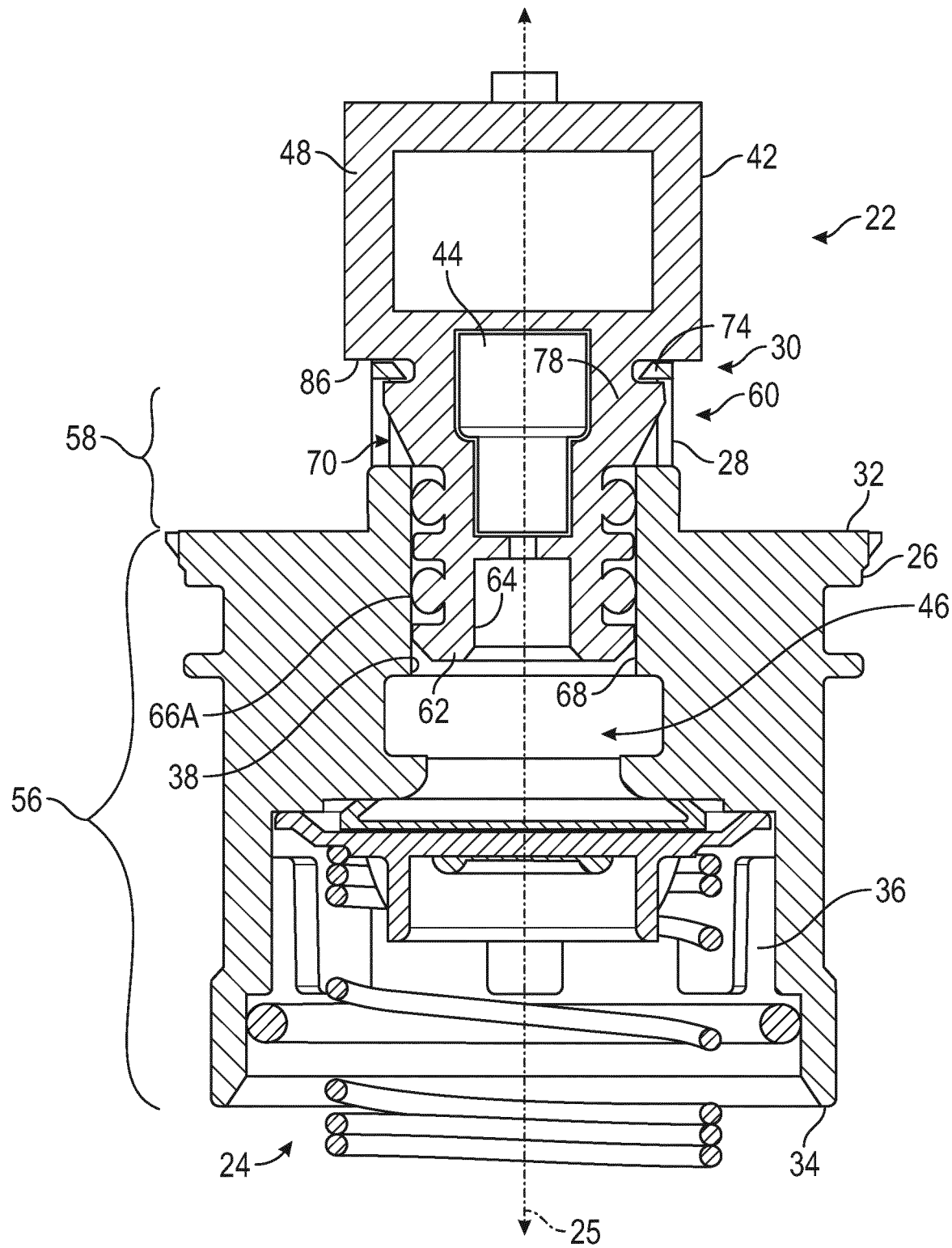
FIG. 2 is a schematic cross-sectional view of the pressure relief assembly and the sensor apparatus coupled to a cap of the pressure relief assembly, which may be taken along a central axis of FIG. 1 with a main housing removed.

Referring to FIG. 2, the pressure relief assembly 22 includes a cap 26 configured to house the valve components 24 of the pressure relief assembly 22. As best shown in FIG. 1, the cap 26 is coupled to the aperture 18. In certain configurations, the cap 26 is at least partially disposed in the aperture 18 of the main housing 16. It is to be appreciated that FIG. 2 is illustrative of the valve components 24 of the pressure relief assembly 22 that may be used for any of the configurations discussed herein, and is not repeatedly shown or discussed for the various configurations described herein.

The cap 26 includes a ring 28 having a retaining portion 30. As discussed further below, the retaining portion 30 of the ring 28 may be various configurations. FIGS. 2, 3, 6, 8, 9, 11-16, 18 and 19 illustrate non-limiting examples of the retaining portion 30 of the ring 28.

Referring to FIG. 2, the cap 26 may include a first end 32 and a second end 34 spaced from each other. Generally, the ring 28 may extend from the first end 32 of the cap 26. The cap 26 may define a chamber 36 that houses the valve components 24 of the pressure relief assembly 22. The cap 26 may also define a passageway 38 through the first end 32 of the cap 26, and the passageway 38 fluidly connects to the chamber 36. Additionally, the ring 28 may define an opening 40 that fluidly connects with the passageway 38.

The pressure relief assembly 22 also includes a sensor apparatus 42 coupled to the cap 26. In certain configurations, the sensor apparatus 42 is coupled to the cap 26 via the ring 28. The sensor apparatus 42 is shown schematically in FIG. 1 because any of the configurations of the sensor apparatus 42 discussed herein may be coupled to the main housing 16 via the various configurations of the retaining portion 30 of the cap 26.

The sensor apparatus 42 is configured to sense whether the predetermined pressure threshold is reached. For example, the sensor apparatus 42 is configured to sense whether the predetermined pressure threshold is reached in the main housing 16. Generally, the valve components 24 of the pressure relief assembly 22 operate to relieve pressure when the predetermined pressure threshold is reached. The pressure may be relieved through the valve components 24 housed in the cap 26, and the vapors are vented to the vapor control structure 14 from the pressure relief assembly 22. As such, the valve components 24 of the pressure relief assembly 22 operate to relieve pressure out of the cap 26 to the vapor control structure 14 when the predetermined pressure threshold is reached. Therefore, generally, the valve components 24 of the pressure relief assembly 22 operate to relieve pressure in the main housing 16 when the predetermined pressure threshold is reached. Again, the predetermined pressure threshold may be any suitable pressure based on engineering requirements, government requirements, etc.

If too much vapor pressure builds in the main housing 16, the valve components 24 of the pressure relief assembly 22 may operate to open the bypass to vent the vapors out to the vapor control structure 14. The valve components 24 of the pressure relief assembly 22 may be mechanically operated in which the pressure is greater than a biasing force to open the bypass valve or automated using a solenoid or similar device to open the bypass valve.

The sensor apparatus 42 may include a sensor 44 (see FIG. 2) that measures or senses the amount of pressure in the main housing 16. More specifically, the sensor 44 may measure the amount of pressure between the sensor apparatus 42 and the valve component 24 of the pressure relief assembly 22. For illustrative purposes, as one non-limiting example, FIG. 2 identifies a general location 46 where the sensor 44 may sense the pressure in the main housing 16.

The sensor apparatus 42 may communicate with other sensors or indicators of the vehicle to identify excess pressure. The sensor apparatus 42 may also compile and/or store information regarding the amount of pressure inside the main housing 16 and/or the tank 12. FIGS. 2, 4, 5, 7, 8, 10-12, 14, 15, 17, 18 and 20 illustrate non-limiting examples of various configurations of the sensor apparatus 42 which cooperate with the respective retaining portion 30 of the ring 28 (of the cap 26).

The sensor apparatus 42 may include a central body 48 that houses various components of the sensor apparatus 42. Non-limiting examples of the various components of the sensor apparatus 42 may include the sensor 44 discussed above, one or more additional sensors, electrical circuits, wiring, etc.

A controller 50 may be in communication with the sensor apparatus 42, the first valve apparatus 20, one or more other sensors, etc., in which instructions may be stored in a memory 52 of the controller 50 and automatically executed via a processor 54 of the controller 50 to provide the respective control functionality, etc. Therefore, information regarding the pressure in the main housing 16 may be communicated to the controller 50, and the controller 50 may determine whether to operate the first valve apparatus 20, and/or operate the solenoid of the valve components 24 of the pressure relief assembly 22 if the pressure relief assembly 22 is using a solenoid.

The cap 26 may include a first body portion 56 and a second body portion 58 (these portions 56, 58 are numbered in FIG. 2, but it is to be appreciated that each of the caps 26 discussed herein include the first and second body portions 56, 58). The first body portion 56 may remain the same configuration in various applications, and the second body portion 58 may have different configurations in different applications depending on the way the cap 26 connects to the sensor apparatus 42. By having the first body portion 56 remain the same, costs for molding the cap 26 may be reduced because one mold may be used for many different applications of the cap 26.

The second body portion 58 may have different configurations as discussed above. FIGS. 2, 3, 6, 8, 9, 11-16, 18 and 19, illustrate various examples of the configurations of the second body portion 58. Therefore, depending on the application, the valve assembly 10 may use one of these caps 26 and one of the corresponding configurations of the sensor apparatus 42.

The sensor apparatus 42 includes a retaining portion 60 engaging the retaining portion 30 of the ring 28 (of the cap 26). Therefore, the retaining portion 60 of the sensor apparatus 42 and the retaining portion 30 of the ring 28 cooperate to secure the sensor apparatus 42 to the cap 26, and ultimately secure the sensor apparatus 42 to the main housing 16. The various configurations of securing the sensor apparatus 42 to the cap 26, as detailed below, ensures a desired fit between the sensor apparatus 42 and the cap 26 without affecting the operational ability of the sensor apparatus 42 and/or the valve components 24 of the pressure relief assembly 22. As discussed further below, the retaining portion 60 of the sensor apparatus 42 may be various configurations. FIGS. 2, 4, 5, 7, 8, 10-12, 14, 15, 17, 18 and 20 illustrate non-limiting examples of the retaining portion 60 of the sensor apparatus 42.

Referring to FIG. 2, in certain configurations, the sensor apparatus 42 may include a plug 62 disposed in the passageway 38. The plug 62 closes the passageway 38 of the cap 26, and thus, vapors may enter the sensor apparatus 42 through the plug 62. Therefore, the plug 62 may define a depression 64 that fluidly connects with the passageway 38 and/or the chamber 36 of the cap 26. The sensor 44 of the sensor apparatus 42 is disposed adjacent to the depression 64 to sense the pressure generally in the main housing 16, and more specifically in the passageway 38.

Continuing with FIG. 2, generally, an outer surface 66A of the plug 62 engages an inner wall 68 of the cap 26 to prevent vapors from exiting between the outer surface 66A and the inner wall 68. Therefore, vapors do not escape the cap 26 between the outer surface 66A and the inner wall 68. It is to be appreciated that the plug 62 may include one or more seals, gaskets, o-rings, etc., to prevent vapors from escaping between the outer surface 66A and the inner wall 68. The configuration of the plug 62 and the way the plug 62 mounts to the cap 26 as shown in FIG. 2 is illustrative for all of the configurations discussed herein (except for FIGS. 19 and 20 which will be discussed below), and this is not repeatedly shown for the various configurations described herein.

Figure 3:
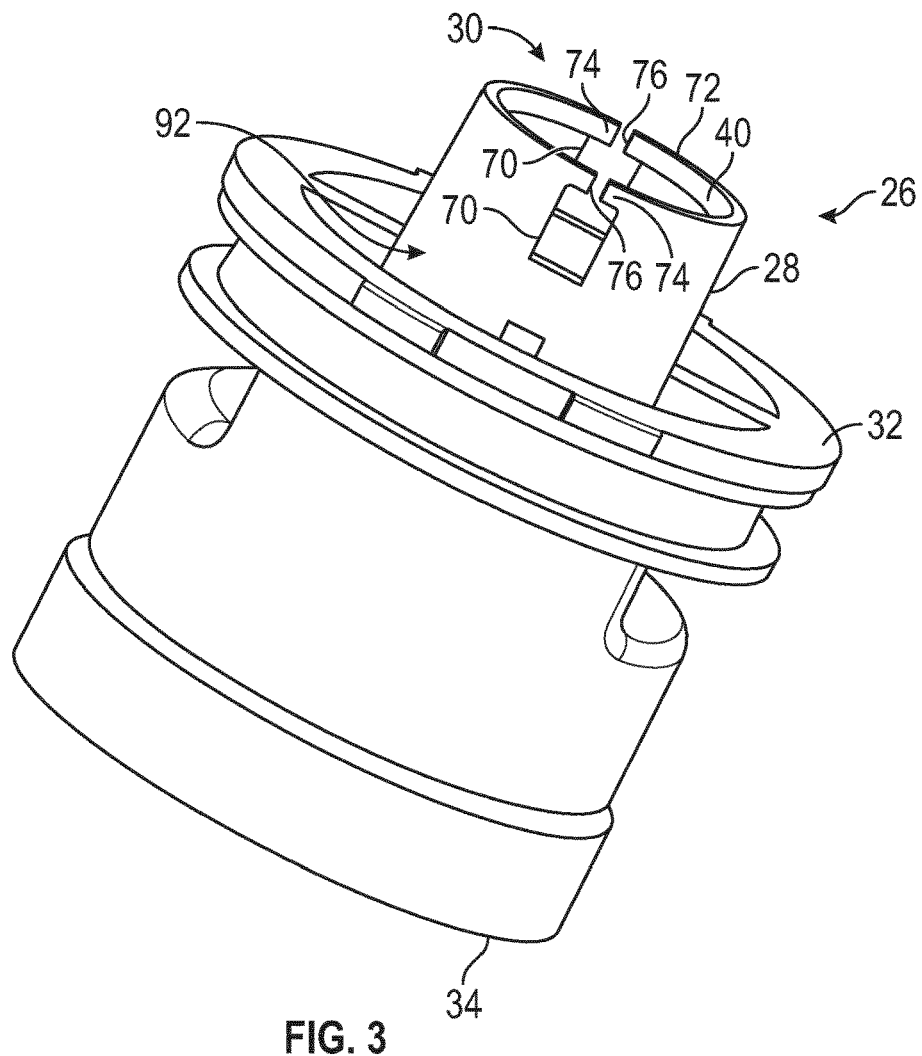
FIG. 3 is a schematic perspective view of the cap of a first configuration that may be suitable for FIGS. 1 and 2.
Figure 4:
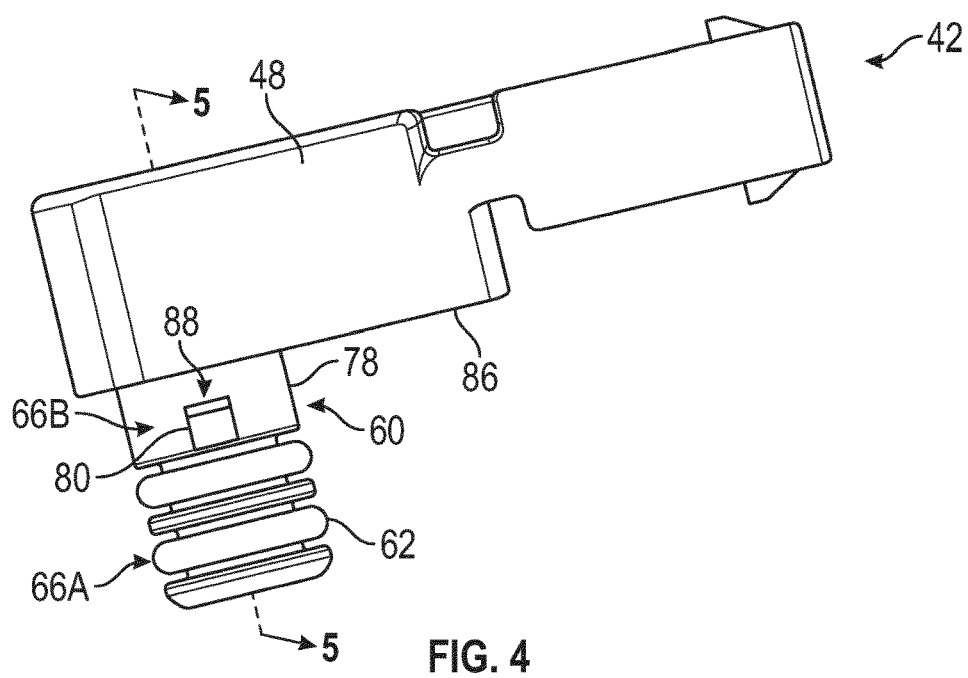
FIG. 4 is a schematic perspective view of the sensor apparatus of a first configuration that cooperates with the cap of FIG. 3.
Figure 5:
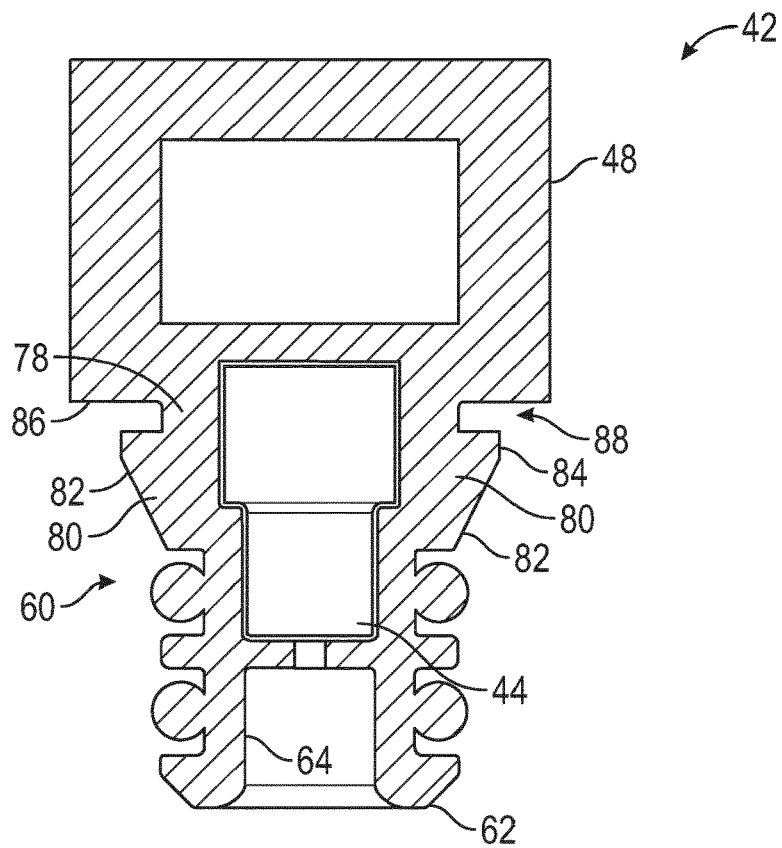
FIG. 5 is a schematic cross-sectional view of the sensor apparatus that may be taken along lines 5-5 of FIG. 4 or lines 5-5 of FIG. 7.

Referring to FIGS. 3-5, one example of the retaining portion 30 of the ring 28 and the retaining portion 60 of the sensor apparatus 42 is shown. In this example, as best shown in FIG. 3, the retaining portion 30 of the ring 28 may define a plurality of windows 70 spaced from each other. The windows 70 may be defined through the ring 28 and may be spaced from a distal end 72 of the ring 28. Therefore, the ring 28 may include a strip 74 disposed between each of the windows 70 and the distal end 72. The strip 74 may define a cut 76 that partially or completely separates the strip 74 into two pieces to allow the strip 74 to flex under force to attach or detach the sensor apparatus 42 from the cap 26.

As best shown in FIG. 4, the sensor apparatus 42 may include a collar 78 that extends outwardly from the central body 48. The plug 62 may extend outwardly from the collar 78 away from the central body 48. Therefore, the collar 78 is disposed between the plug 62 and the central body 48. The collar 78 may be disposed in the opening 40 of the ring 28. FIG. 2 may represent the collar 78 disposed in the opening 40 of the ring 28. It is to be appreciated that other configurations discussed herein may include the collar 78.

Referring to FIGS. 2, 4 and 5, the retaining portion 60 of the sensor apparatus 42 is secured to the collar 78. Also referring to FIG. 2, the retaining portion 60 of the sensor apparatus 42 is at least partially disposed in the opening 40. The retaining portion 60 of the sensor apparatus 42 may include a plurality of tabs 80 (see FIGS. 4 and 5) that protrude outwardly from the collar 78. More specifically, the collar 78 may include an outer surface 66B, and the tabs 80 may protrude outwardly from the outer surface 66B. The outer surface 66B of the collar 78 and the outer surface 66A of the plug 62 are adjacent to each other. As best shown in FIG. 5, the tabs 80 may include a sloped or angled portion 82 that slopes/angles from the outer surface 66B, and terminates at a distal edge 84 spaced from the outer surface 66B.

Generally, the tabs 80 are spaced from each other around the collar 78. In certain configurations, as shown in FIG. 5, the tabs 80 oppose each other around the outer surface 66B.

Turning to FIGS. 2 and 5, a respective one of the tabs 80 is disposed in a respective one of the windows 70 to secure the sensor apparatus 42 to the cap 26. More specifically, the central body 48 may include a face 86 that the collar 78 extends from, and the tabs 80 are spaced from the face 86 to define a slot 88 between each of the tabs 80 and the face 86. The strip 74 is disposed in the slot 88 between the respective tabs 80 to secure the sensor apparatus 42 to the cap 26. Therefore, the sensor apparatus 42 attaches to the cap 26 by inserting the plug 62 into the passageway 38, which positions the collar 78 in the opening 40, and the strip 74 between each of the windows 70 ride over the angled portion 82 of the respective tabs 80 until the tabs 80 are disposed in respective windows 70 and the strip 74 is disposed in the slot 88 between the respective tabs 80. It is to be appreciated that the strip 74 between each of the windows 70 and/or the tabs 80 may flex under force to attach or detach the sensor apparatus 42 from the cap 26.

Figure 6:
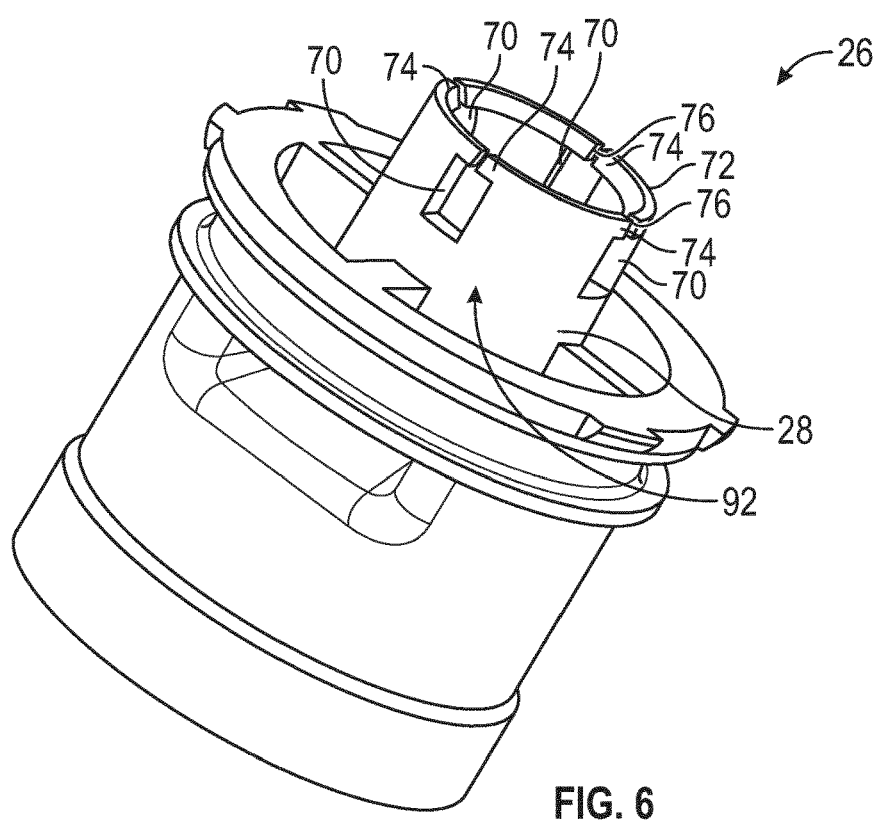
FIG. 6 is a schematic perspective view of the cap of a second configuration that may be suitable for FIGS. 1 and 2.
Figure 7:
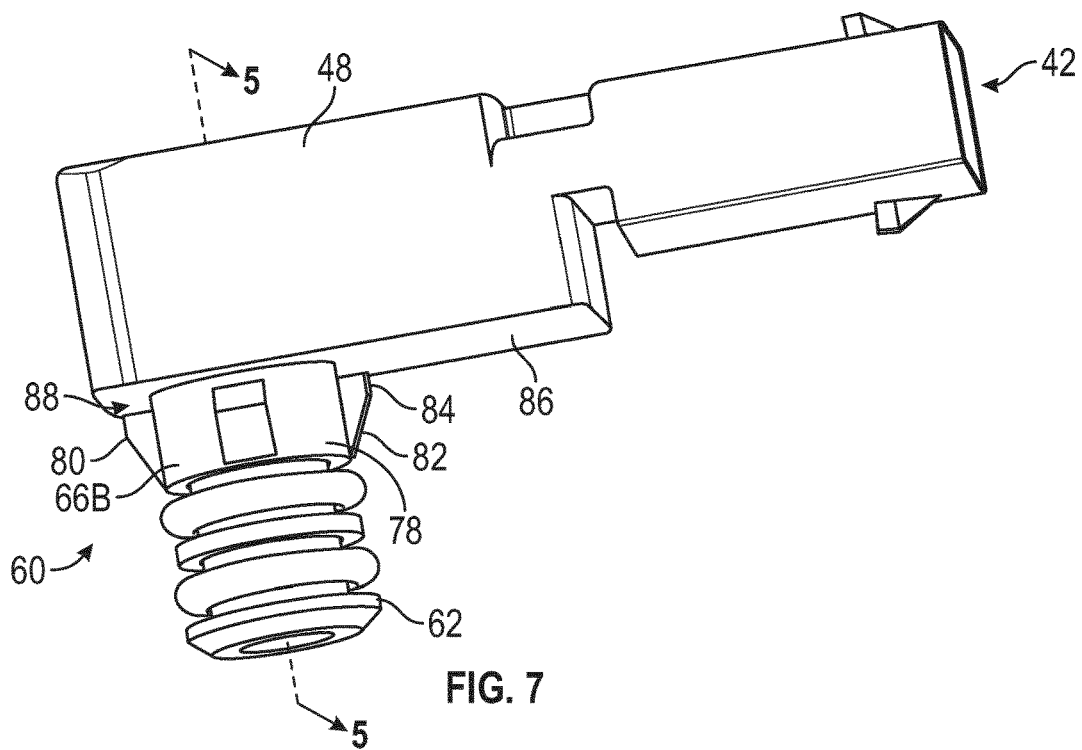
FIG. 7 is a schematic perspective view of the sensor apparatus of a second configuration that cooperates with the cap of FIG. 6.

FIGS. 3 and 4 may be illustrative of a configuration where a pair of the tabs 80 and a pair of the windows 70 are used to secure the sensor apparatus 42 to the cap 26. However, more or less of the tabs 80 and the windows 70 may be used. For example, FIGS. 6 and 7 illustrate a configuration where more than two of the tabs 80 are used, and correspondingly, more than two of the windows 70 are used. The discussion above for FIGS. 3-5 also applies to FIGS. 6 and 7, and will not be repeated. Also FIG. 2 applies to FIGS. 6 and 7, which illustrates the retaining portion 60 of the sensor apparatus 42 is at least partially disposed in the opening 40, and the respective tabs 80 disposed in respective windows 70. In the configuration of FIGS. 6 and 7, the plurality of tabs 80 may include a pair of the tabs 80 that oppose each other around the outer surface 66B and another pair of the tabs 80 that oppose each other around the outer surface 66B. Similarly, the retaining portion 30 of the ring 28 may define a pair of the windows 70 that oppose each other around the ring 28 and another pair of the windows 70 that oppose each other around the ring 28. The respective pair of the tabs 80 are disposed in the respective pair of the windows 70 to secure the sensor apparatus 42 to the cap 26. In this configuration, the sensor apparatus 42 attaches to the cap 26 by inserting the plug 62 into the passageway 38, which positions the collar 78 in the opening 40, and the strip 74 between each of the windows 70 ride over the angled portion 82 of the respective tabs 80 until the tabs 80 are disposed in respective windows 70 and the strip 74 is disposed in the slot 88 between the respective tabs 80.

Figure 8:
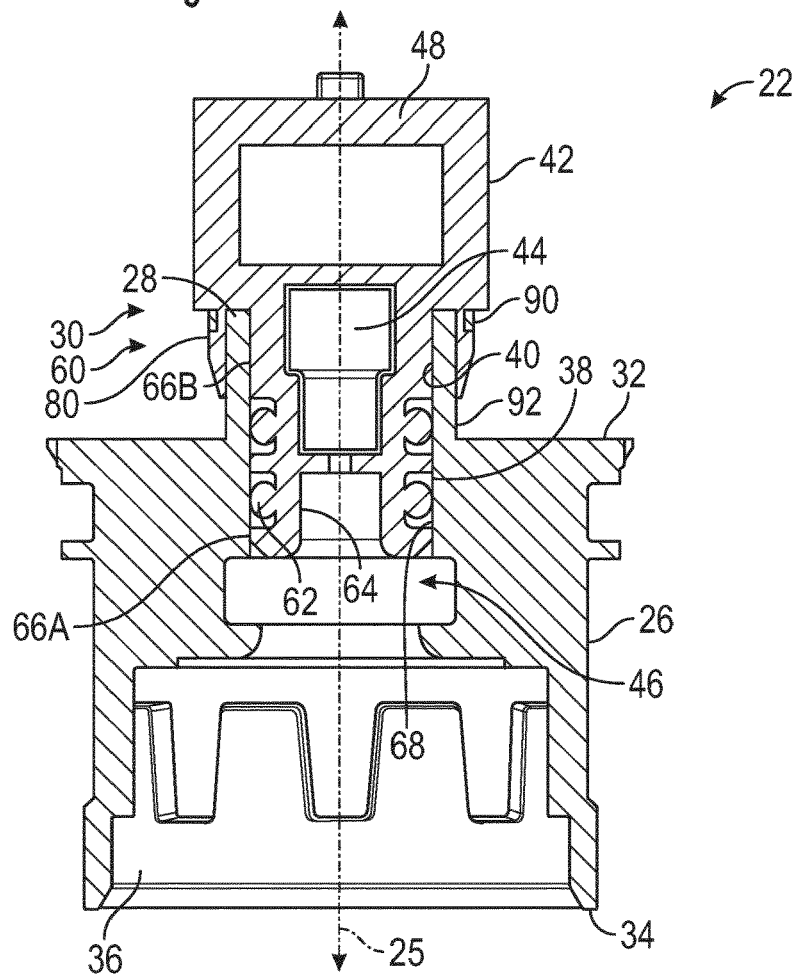
FIG. 8 is a schematic cross-sectional view of the cap and the sensor apparatus of a third configuration that may be suitable for FIG. 1, which may be along the central axis of FIG. 1 with the main housing and internal components of the pressure relief assembly removed.
Figure 9:
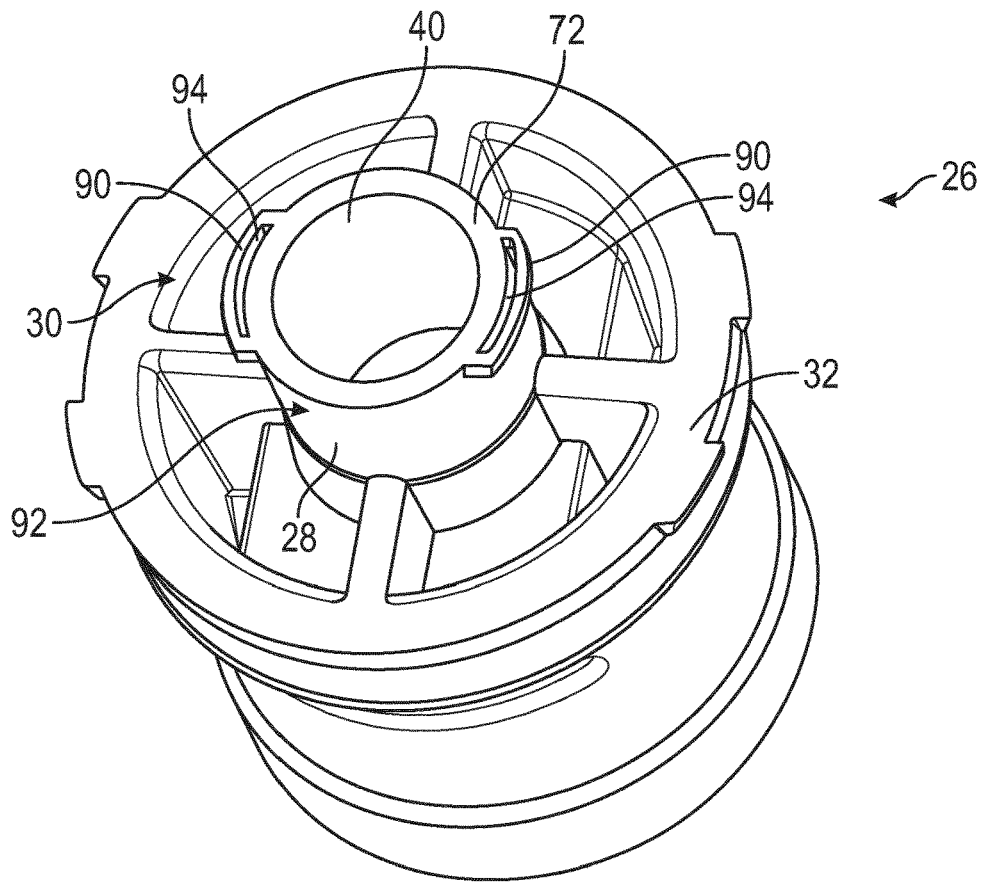
FIG. 9 is a schematic perspective view of the cap of FIG. 8.
Figure 10:
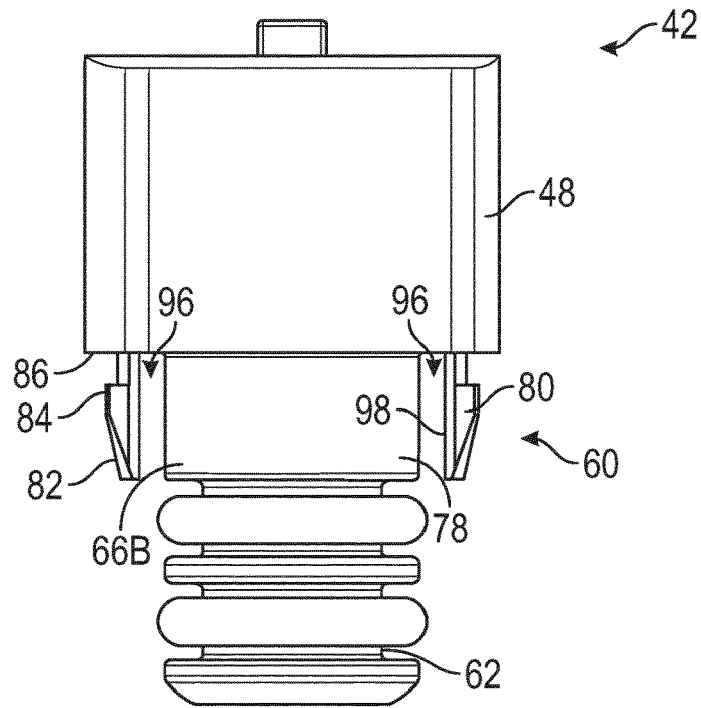
FIG. 10 is a schematic perspective view of the sensor apparatus of FIG. 8.

Referring to FIGS. 8-10, the retaining portion 30 of the ring 28 and the retaining portion 60 of the sensor apparatus 42 may be different than the configurations of FIGS. 3-7. Turning to FIG. 9, in this configuration, the retaining portion 30 of the ring 28 includes a plurality of eyelets 90 spaced from each other. The ring 28 may include an exterior surface 92 spaced from the opening 40 of the ring 28, and the eyelets 90 are secured to the exterior surface 92. Generally, the eyelets 90 loop around the exterior surface 92 to define a slit 94 between the exterior surface 92 and the respective eyelets 90.

Turning to FIG. 10, the retaining portion 30 of the sensor apparatus 42 may include a plurality of tabs 80 that protrude outwardly from the central body 48 adjacent to the collar 78 to define a gap 96 between the tabs 80 and the collar 78. Therefore, in this configuration, the tabs 80 do not protrude from the collar 78, and instead are spaced from the collar 78. More specifically, the gap 96 is disposed between the outer surface 66B of the collar 78 and a back side 98 of the tabs 80. Generally, the tabs 80 protrude outwardly away from the back side 98. As best shown in FIGS. 8 and 10, the tabs 80 may include a sloped or angled portion 82 that slopes/angles outwardly away from the back side 98, and terminates at a distal edge 84 spaced from the back side 98.

The tabs 80 are disposed through the respective eyelets 90 of the ring 28 to secure the sensor apparatus 42 to the cap 26, and the collar 78 is disposed in the opening 40 of the ring 28 with a portion of the ring 28 disposed in the gap 96 when the sensor apparatus 42 is secured to the cap 26. The tabs 80 in this configuration are disposed outside of the ring 28 when the sensor apparatus 42 is secured to the cap 26. Therefore, the tabs 80 surround the exterior surface 92 of the ring 28 when the sensor apparatus 42 is secured to the cap 26. Therefore, the sensor apparatus 42 attaches to the cap 26 by inserting the plug 62 into the passageway 38, which positions the collar 78 in the opening 40, and the tabs 80 are inserted into the slit 94 of the respective eyelet 90 and the angled portion 82 of the respective tabs 80 ride over the respective eyelets 90 until the tabs 80 are disposed on the other side of the respective eyelets 90 such that the eyelets 90 are disposed between the tabs 80 and the face 86 of the central body 48 of the sensor apparatus 42. It is to be appreciated that the eyelets 90 and/or the tabs 80 may flex under force to attach or detach the sensor apparatus 42 from the cap 26.

Figure 11:
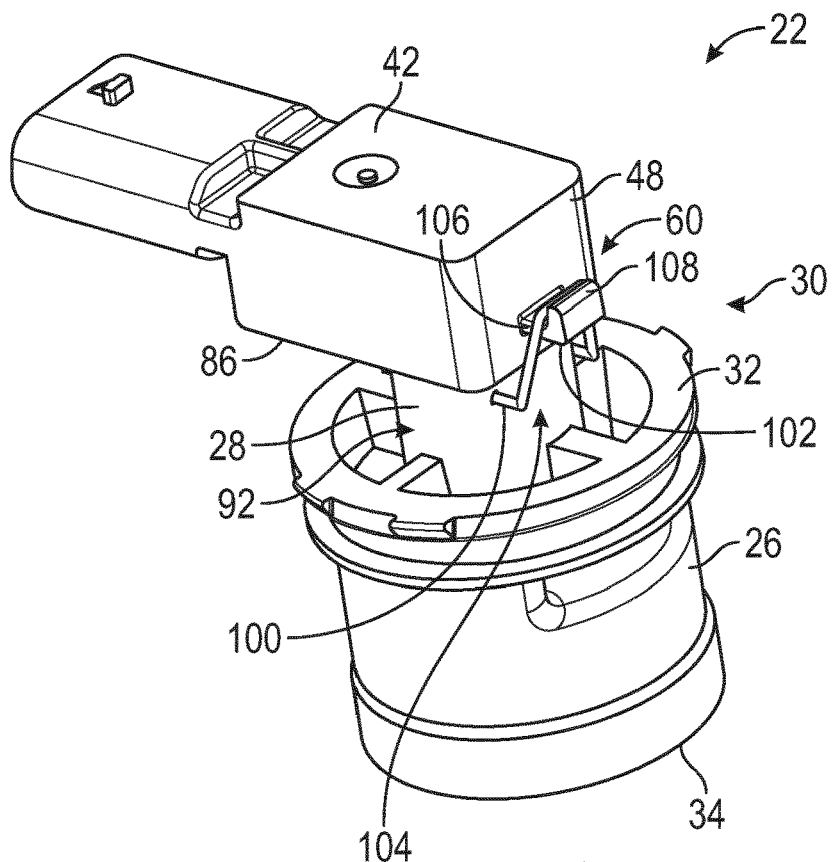
FIG. 11 is a schematic perspective view of the cap and the sensor apparatus of a fourth configuration that may be suitable for FIG. 1.

Referring to FIG. 11, another configuration of the retaining portion 30 of the ring 28 and the retaining portion 60 of the sensor apparatus 42 is shown. In this configuration, the ring 28 may include the exterior surface 92 spaced from the opening 40 of the ring 28 as discussed above for another configuration. The retaining portion 30 of the ring 28 may include a loop 100, and the retaining portion 60 of the sensor apparatus 42 may include a hook 102 extending from the central body 48. The hook 102 at least partially surrounds the loop 100 to secure the sensor apparatus 42 to the cap 26.

The loop 100 may extend from the exterior surface 92 of the ring 28 to define a space 104 in which the hook 102 is disposed through. The hook 102 may further include an extension 106 and a stop 108 disposed at an end of the extension 106. When the sensor apparatus 42 is secured to the cap 26, the loop 100 rests on the extension 106, and the stop 108 prevents the loop 100 from detaching from the hook 102. Therefore, in this configuration, the sensor apparatus 42 attaches to the cap 26 by inserting the hook 102 through the space 104 of the loop 100 and rotating the sensor apparatus 42 to insert the plug 62 into the passageway 38 which positions the collar 78 in the opening 40. Rotating the sensor apparatus 42 causes the hook 102 to wrap around the loop 100, and the loop 100 rests on the extension 106 adjacent to the stop 108.

Figure 12:
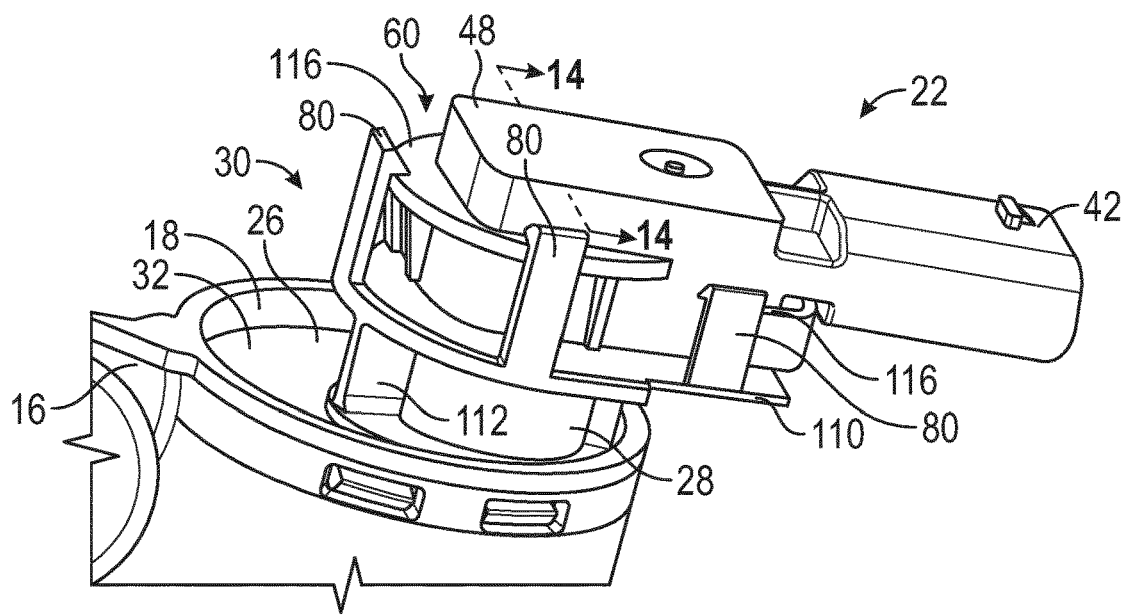
FIG. 12 is a schematic perspective view of the cap and the sensor apparatus of a fifth configuration that may be suitable for FIG. 1.
Figure 13:
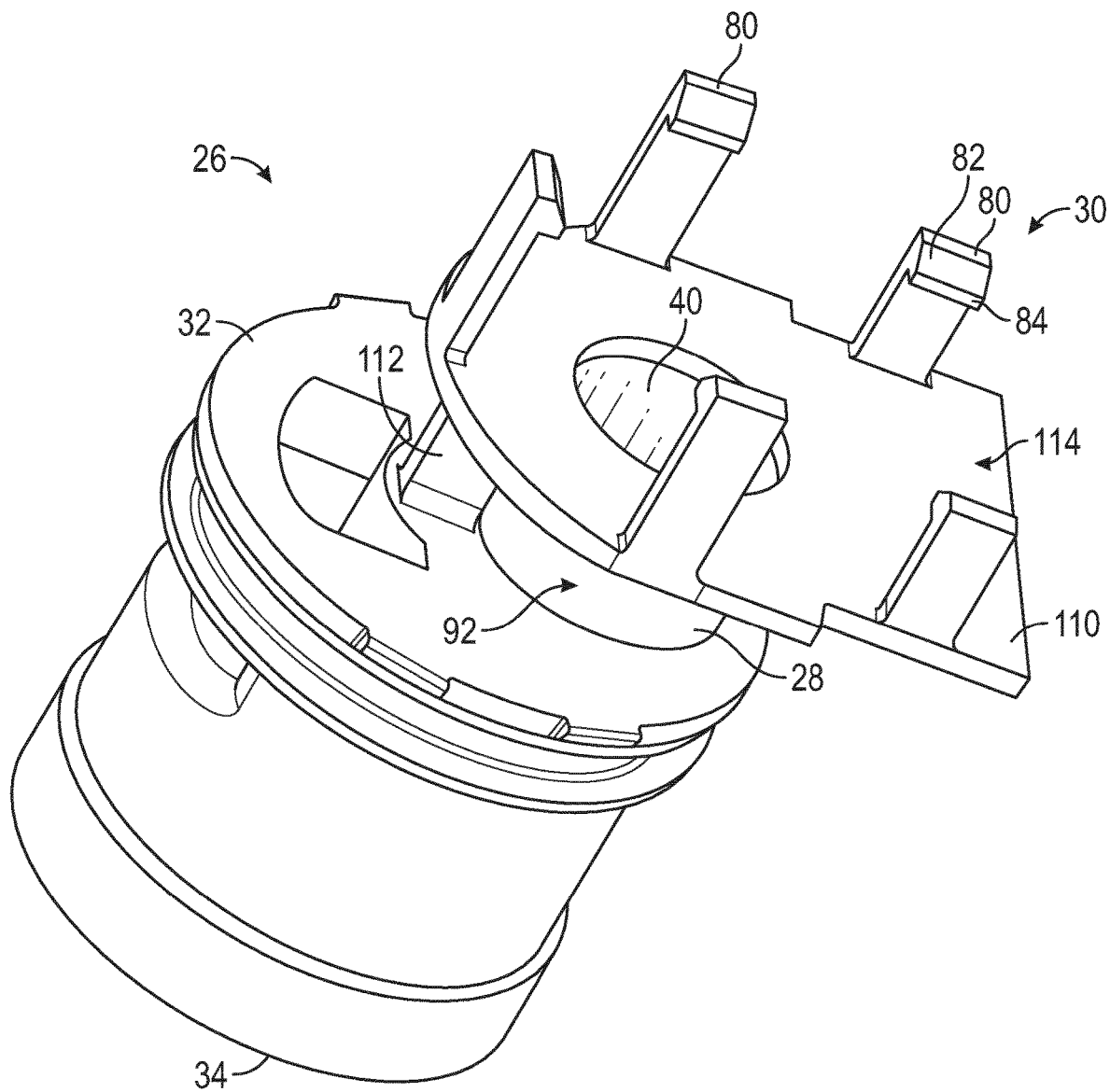
FIG. 13 is a schematic perspective view of the cap of FIG. 12.
Figure 14:
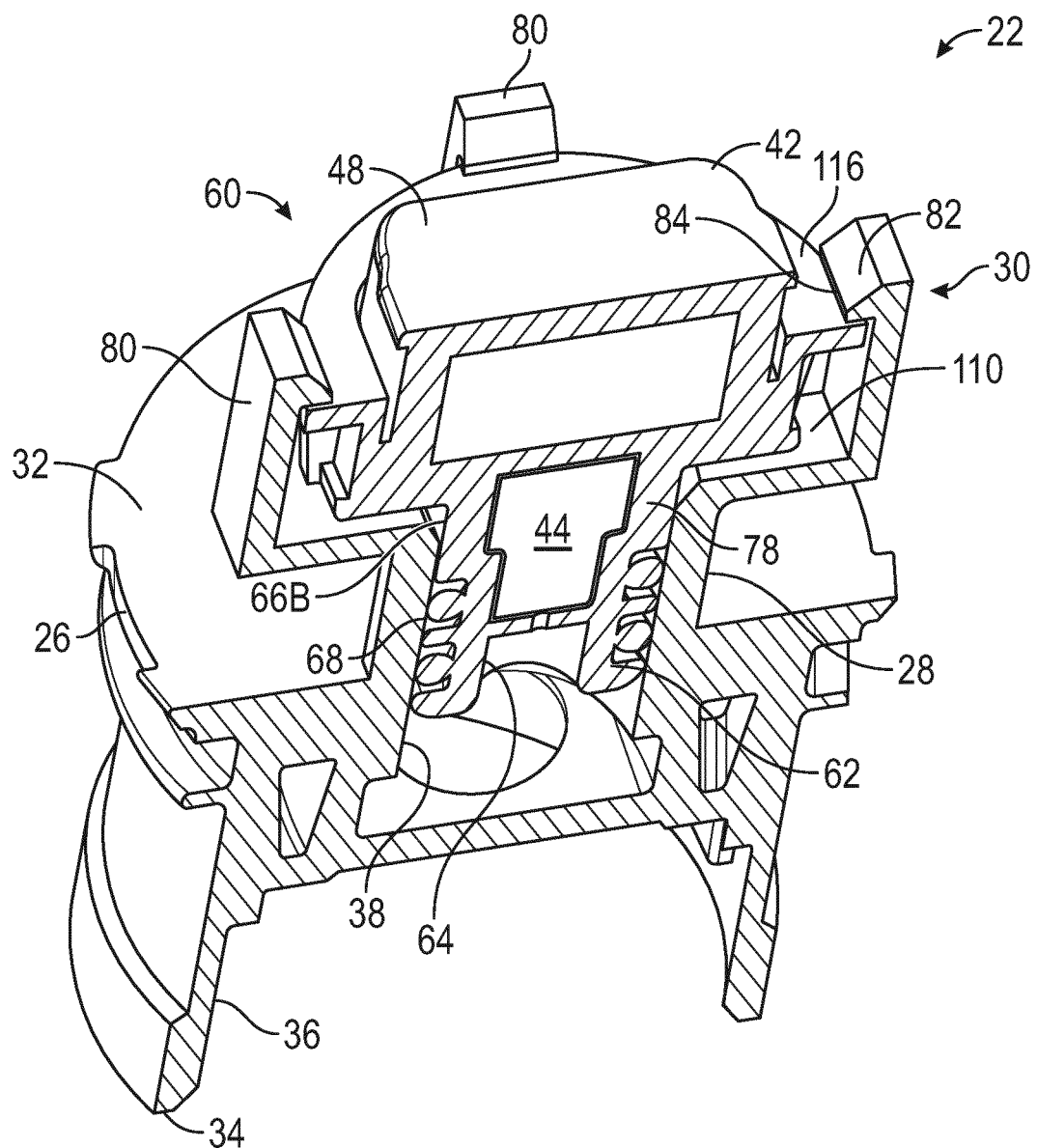
FIG. 14 is a schematic cross-sectional view of the cap and the sensor apparatus taken along lines 14-14 of FIG. 12 with the main housing and the internal components of the pressure relief assembly removed.
Figure 15:
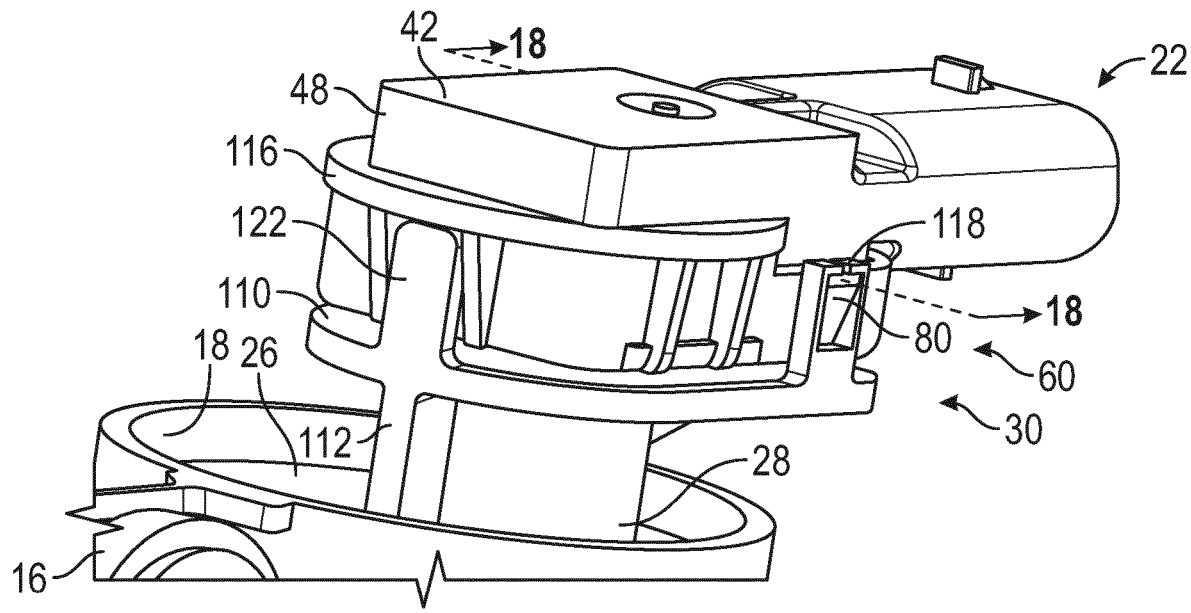
FIG. 15 is a schematic perspective view of the cap and the sensor apparatus of a sixth configuration that may be suitable for FIG. 1.

Referring to FIGS. 12-14, yet another configuration of the retaining portion 30 of the ring 28 and the retaining portion 60 of the sensor apparatus 42 is shown. The ring 28 may include a platform 110 spaced from the first end 32 of the cap 26. Generally, the platform 110 supports the sensor apparatus 42. It is to be appreciated that one or more supports 112 may be disposed between the platform 110 and the first body portion 56 of the cap 26 to strengthen the platform 110.

As best shown in FIG. 13, in this configuration, the retaining portion 30 of the ring 28 may include a plurality of tabs 80 spaced from each other, and the tabs 80 extend from the platform 110. The platform 110 and the tabs 80 cooperate with each other to define a pocket 114 to receive the central body 48. Generally, the tabs 80 face inwardly toward the pocket 114. As best shown in FIG. 14, the tabs 80 may include a sloped or angled portion 82 that slopes/angles toward the pocket 114, and terminates at a distal edge 84.

As best shown in FIGS. 12 and 14, the retaining portion 60 of the sensor apparatus 42 may include at least one lip 116 that protrudes from the central body 48. The tabs 80 engage the lip 116 to secure the central body 48 in the pocket 114. In certain configurations, the at least one lip 116 is further defined as a plurality of lips 116 spaced from each other, and each of the lips 116 protrude from the central body 48. Furthermore, in certain configurations, more than one of the tabs 80 engage one of the lips 116, and one of the tabs 80 engage another one of the lips 116. In this configuration, the sensor apparatus 42 attaches to the cap 26 by inserting the plug 62 into the passageway 38, which positions the collar 78 in the opening 40, and the angled portion 82 of the respective tabs 80 ride over the respective lips 116 until the lips 116 are disposed between the respective tabs 80 and the platform 110. It is to be appreciated that the lips 116 and/or the tabs 80 may flex under force to attach or detach the sensor apparatus 42 from the cap 26.

Referring to FIGS. 15-18, yet another configuration of the retaining portion 30 of the ring 28 and the retaining portion 60 of the sensor apparatus 42 is shown. This configuration has similar features to the configuration of FIGS. 12-14. For this configuration, the ring 28 may include the platform 110 spaced from the first end 32 of the cap 26 as discussed above for FIGS. 12-14. Furthermore, for this configuration, the platform 110 supports the sensor apparatus 42 as discussed above for FIGS. 12-14. Also, as discussed above for FIGS. 12-14, for the configuration of FIGS. 15-18, it is to be appreciated that one or more of the supports 112 may be disposed between the platform 110 and the first body portion 56 of the cap 26 to strengthen the platform 110.

Figure 16:
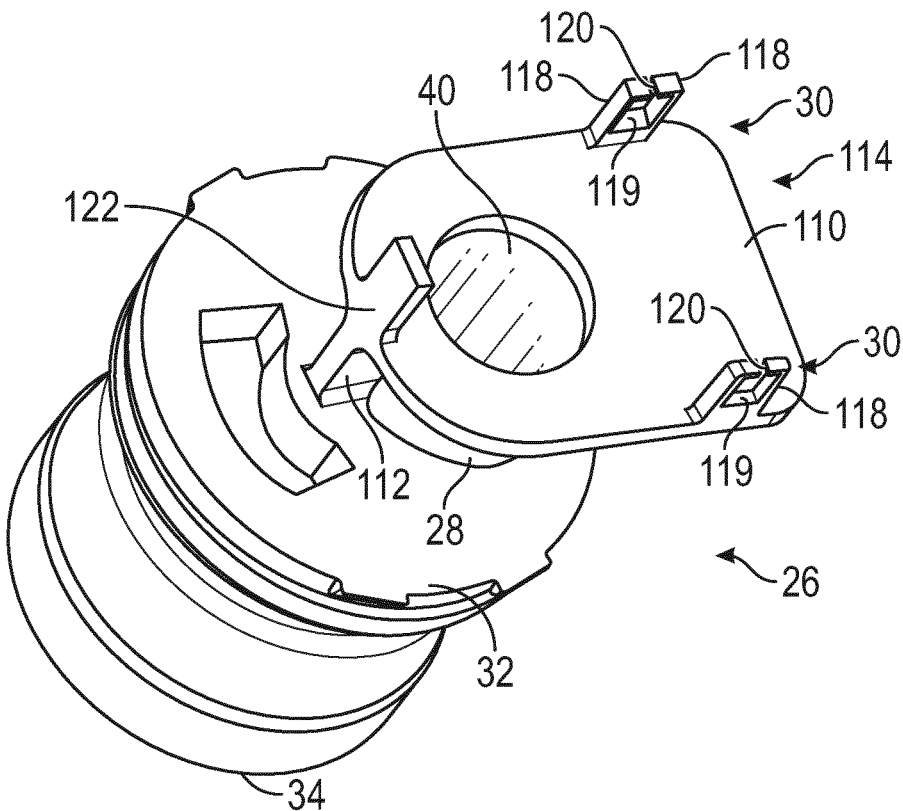
FIG. 16 is a schematic perspective view of the cap of FIG. 15.
Figure 17:
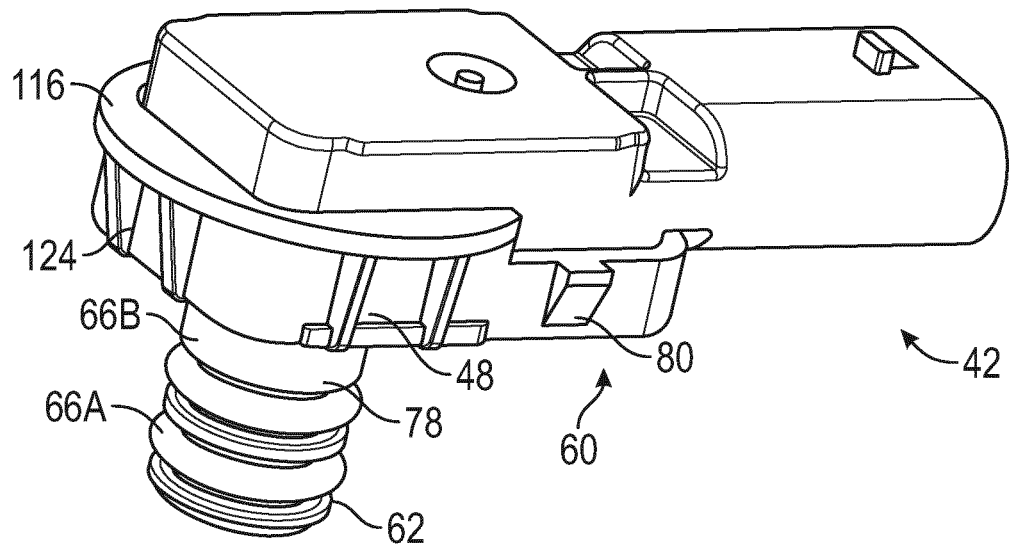
FIG. 17 is a schematic perspective view of the sensor apparatus of FIG. 15.

As best shown in FIG. 16, in this configuration, the retaining portion 30 of the ring 28 may include a plurality of fingers 118 that extend from the platform 110. One pair of the fingers 118 cooperates to define a window 119 and another pair of the fingers 118 cooperates to define another window 119, and so on, depending on the number of desired windows 119. The pair of the fingers 118 may be spaced from each other to define a cut 120 between the respective fingers 118 to allow the respective fingers 118 to flex under force to attach or detach the sensor apparatus 42 from the cap 26.

As best shown in FIG. 16, the platform 110 may include a post 122. The platform 110, the post 122 and the fingers 118 cooperate with each other to define a pocket 114 to receive the central body 48. Furthermore, the central body 48 may define a recess 124 to receive the post 122. The post 122 and the recess 124 cooperate to provide an anti-rotation feature of the sensor apparatus 42 relative to the cap 26. Therefore, torques applied to the sensor apparatus 42 may be prevented via the anti-rotation feature.

Figure 18:
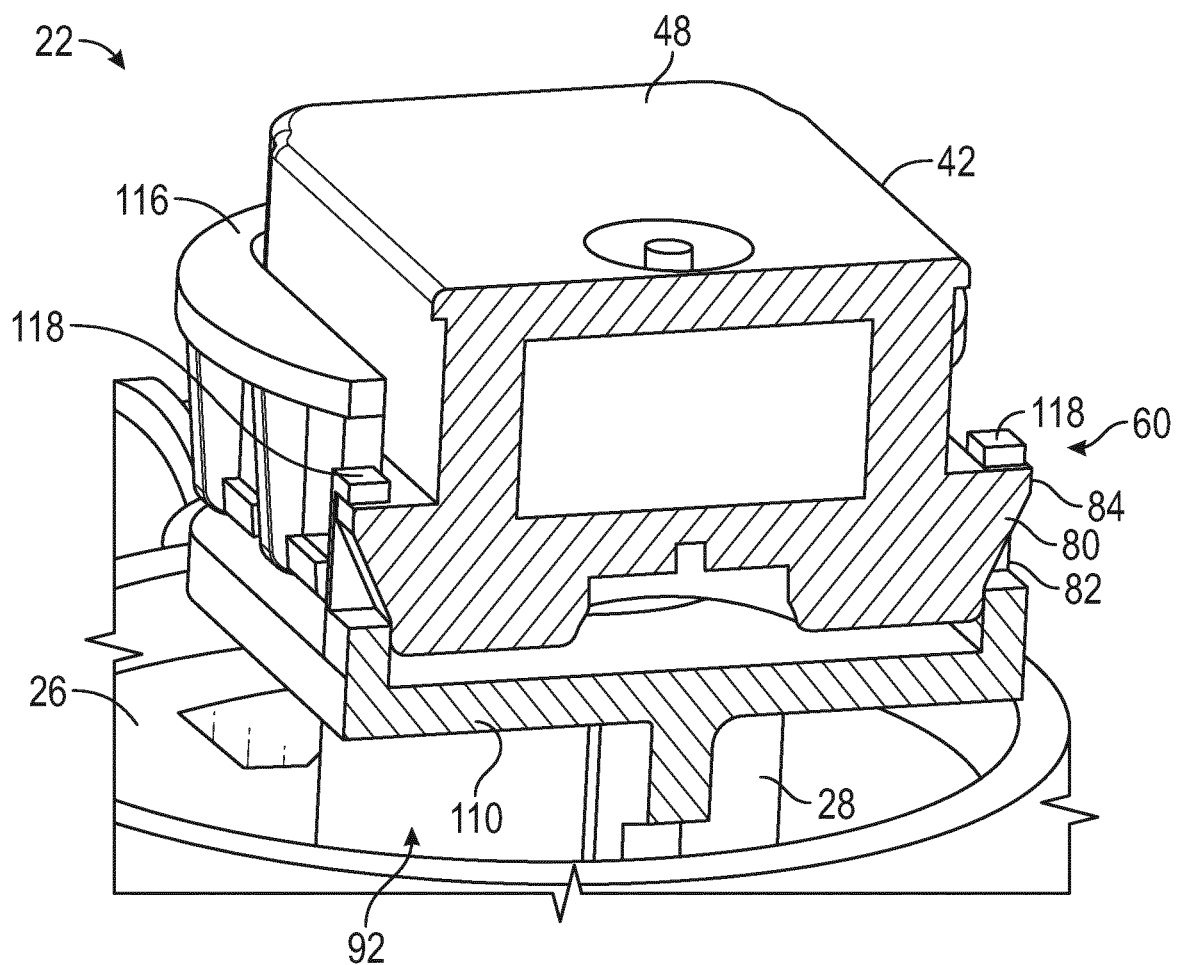
FIG. 18 is a schematic cross-sectional view of the cap and the sensor apparatus taken along lines 18-18 of FIG. 15.

As best shown in FIG. 18, the retaining portion 60 of the sensor apparatus 42 may include a plurality of tabs 80 spaced from each other. More specifically, the tabs 80 may protrude from the central body 48, and the tabs 80 engage the respective windows 119 to secure the central body 48 in the pocket 114. Generally, the tabs 80 face outwardly away from the central body 48. As best shown in FIG. 18, the tabs 80 may include a sloped or angled portion 82 that slopes/angles from the central body 48, and terminates at a distal edge 84 spaced from the central body 48.

The sensor apparatus 42 attaches to the cap 26 by inserting the plug 62 into the passageway 38, which positions the collar 78 in the opening 40 and positions the post 122 in the recess 124, and a portion of the fingers 118 ride over the angled portion 82 of the respective tabs 80 until the tabs 80 are disposed in respective windows 119. It is to be appreciated that the fingers 118 and/or the tabs 80 may flex under force to attach or detach the sensor apparatus 42 from the cap 26.

Figure 19:
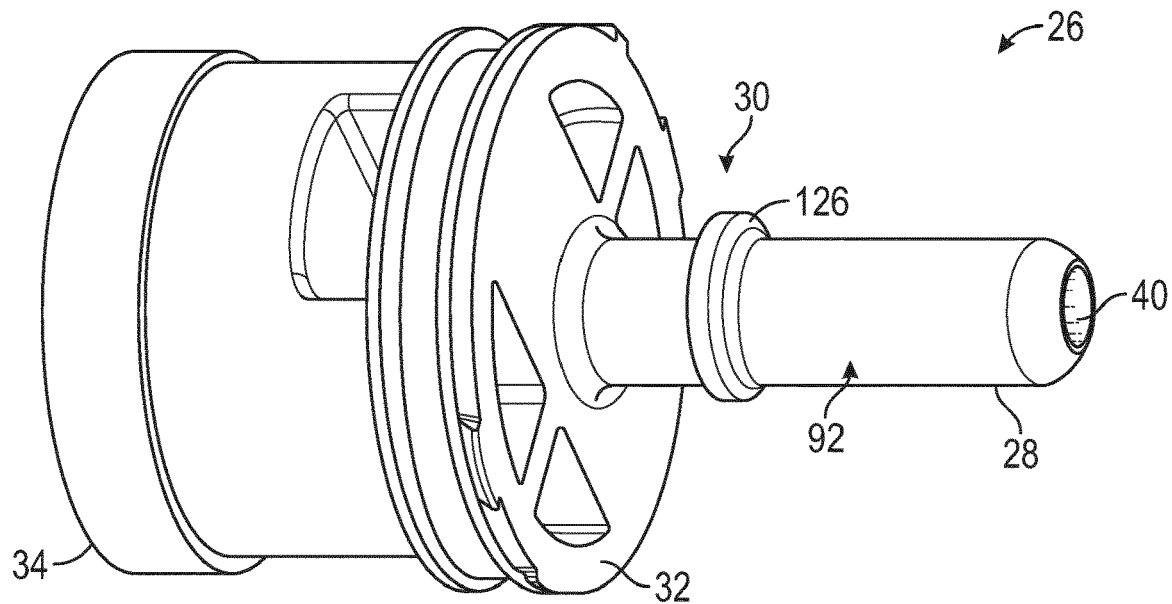
FIG. 19 is a schematic perspective view of the cap of a seventh configuration that may be suitable for FIG. 1.
Figure 20:
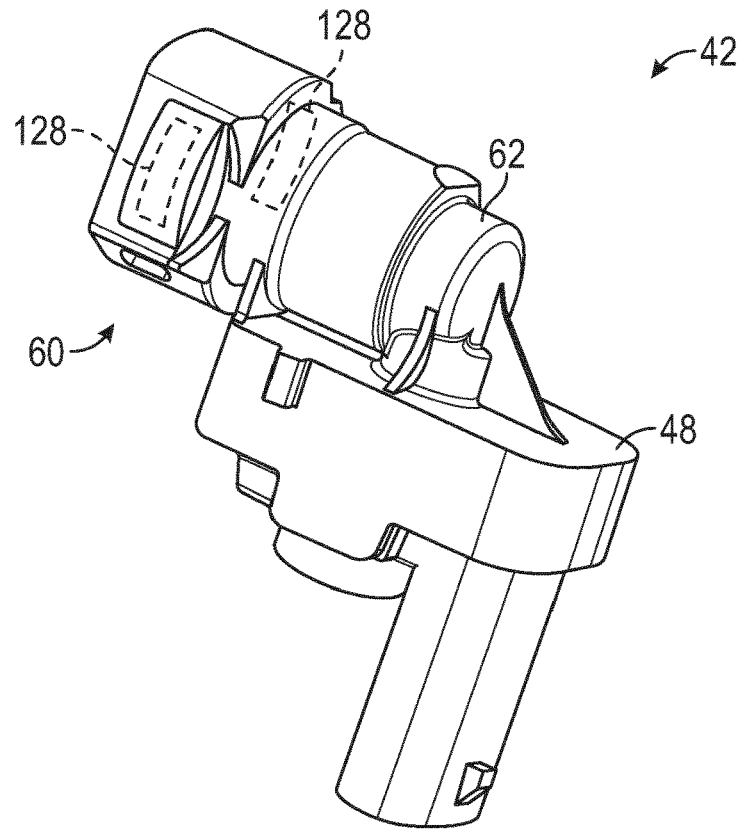
FIG. 20 is a schematic perspective view of the sensor apparatus of a seventh configuration that may cooperate with the cap of FIG. 19.

Referring to FIGS. 19 and 20, yet another configuration of the retaining portion 30 of the ring 28 and the retaining portion 60 of the sensor apparatus 42 is shown. Generally, in this configuration, the retaining portion 30 of the sensor apparatus 42 and the retaining portion 30 of the ring 28 provide a quick-connect. Therefore, in this configuration, the sensor apparatus 42 may be disconnected from the cap 26 quickly or fast. For example, the sensor apparatus 42 may simply be pulled to disconnect from the cap 26.

Referring to FIG. 20, in this configuration, the sensor apparatus 42 may include a plug 62, and the plug 62 is disposed outside of the ring 28. Therefore, at least a portion of the ring 28 is surrounded by the plug 62. The plug 62 closes the passageway 38 of the cap 26, and thus, vapors may enter the sensor apparatus 42 through the plug 62. Therefore, for this configuration, the plug 62 may define the depression 64 that fluidly connects with the passageway 38 and/or the chamber 36 of the cap 26 (as shown in FIG. 2). The sensor 44 of the sensor apparatus 42 is disposed adjacent to the depression 64 to sense the pressure generally in the main housing 16, and more specifically in the passageway 38, again as discussed above with FIG. 2 which applies to FIGS. 19 and 20 as well.

Referring to FIG. 19, the ring 28 may be elongated, and the retaining portion 30 of the ring 28 may include a ledge 126 that protrudes from the exterior surface 92. The ledge 126 may completely or partially surround the exterior surface 92. Furthermore, more than one ledge 126 may be used. The retaining portion 60 of the sensor apparatus 42 may include one or more biasable tabs 128 (see FIG. 20) that engage the ledge 126 when the sensor apparatus 42 is secured to the cap 26. More specifically, the biasable tabs 128 may protrude inwardly relative to the depression 64, or inwardly toward the exterior surface 92 of the ring 28. The biasable tabs 128 are movable to provide the desired quick-connect when a force is applied. The biasable tabs 128 may include a sloped or angled portion that slopes/angles toward the depression 64 or the exterior surface 92 of the ring 28, and terminates at a distal edge spaced from the plug 62. One or more biasable tabs 128 may engage one or more ledges 126.

The sensor apparatus 42 attaches to the cap 26 by inserting the ring 28 into the depression 64 of the plug 62, which positions the plug 62 and the collar 78 around the ring 28, and a portion of the ledge 126 ride over the angled portion 82 of the respective biasable tabs 128 until the biasable tabs 128 pass beyond the ledge 126. The biasable tabs 80 are configured flex under force when the sensor apparatus 42 is pushed over the ledge 126 and pulled back over the ledge 126 to provide a quick-connect.

It is to be appreciated that the cross-sections of the figures herein are to be illustrative of the components, and not limited to any particular types of materials. The various components may be formed of any suitable material(s), and non-limiting examples may include one or more metals, plastics, alloys, polymers, rubbers, etc., and combinations thereof.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly comprising:
a first valve apparatus;
a pressure relief assembly configured to bypass the first valve apparatus;
a main housing that surrounds the first valve apparatus and the pressure relief assembly, and the main housing defines an aperture;
wherein the pressure relief assembly includes:
a plurality of valve components;
a cap configured to house the valve components, and the cap is at least partially disposed in the aperture;
wherein the cap includes a ring having a retaining portion;
a sensor apparatus coupled to the cap via the ring, and the sensor apparatus is configured to sense whether a predetermined pressure threshold is reached in the main housing;
wherein the valve components operate to relieve pressure through the valve components housed in the cap when the predetermined pressure threshold is reached; and
wherein the sensor apparatus includes a retaining portion engaging the retaining portion of the ring.

2. The valve assembly of claim 1 wherein:
the cap includes a first end and a second end spaced from each other, and the ring extends from the first end of the cap;
the cap defines a chamber that houses the valve components; and
the cap defines a passageway through the first end of the cap, and the passageway fluidly connects to the chamber.

3. The valve assembly of claim 2 wherein the ring defines an opening that fluidly connects with the passageway, and wherein the sensor apparatus includes a plug disposed in the passageway.

4. The valve assembly of claim 3 wherein:
the sensor apparatus includes a central body and a collar that extends outwardly from the central body, and the collar is disposed in the opening of the ring;
the plug extends outwardly from the collar away from the central body; and
the collar is disposed between the plug and the central body.

5. The valve assembly of claim 4 wherein the retaining portion of the sensor apparatus is secured to the collar and at least partially disposed in the opening.

6. The valve assembly of claim 5 wherein the retaining portion of the sensor apparatus includes a plurality of tabs that protrude outwardly from the collar.

7. The valve assembly of claim 6 wherein the collar includes an outer surface, and the tabs protrude outwardly from the outer surface.

8. The valve assembly of claim 7 wherein the tabs oppose each other around the outer surface.

9. The valve assembly of claim 7 wherein:
the plurality of tabs includes a pair of the tabs that oppose each other around the outer surface and another pair of the tabs that oppose each other around the outer surface;
the retaining portion of the ring defines a pair of windows that oppose each other around the ring and another pair of windows that oppose each other around the ring; and
the respective pair of the tabs are disposed in the respective pair of the windows to secure the sensor apparatus to the cap.

10. The valve assembly of claim 6 wherein the retaining portion of the ring defines a plurality of windows spaced from each other, and wherein a respective one of the tabs is disposed in a respective one of the windows to secure the sensor apparatus to the cap.

11. The valve assembly of claim 1 wherein:
the retaining portion of the ring includes a plurality of eyelets spaced from each other;
the retaining portion of the sensor apparatus includes a plurality of tabs that protrude outwardly from a central body of the sensor apparatus; and
the tabs are disposed through the respective eyelets of the ring to secure the sensor apparatus to the cap.

12. The valve assembly of claim 11 wherein:
the ring includes an exterior surface spaced from an opening of the ring, and the eyelets are secured to the exterior surface; and
the tabs surround the exterior surface when the sensor apparatus is secured to the cap.

13. The valve assembly of claim 1 wherein:
the ring includes an exterior surface spaced from an opening of the ring;
the exterior surface of the ring includes a loop;
the retaining portion of the sensor apparatus includes a hook extending from a central body of the sensor apparatus; and
the hook at least partially surrounds the loop to secure the sensor apparatus to the cap.

14. The valve assembly of claim 1 wherein:
the ring includes a platform spaced from a first end of the cap, and the platform supports the sensor apparatus;
the retaining portion of the ring includes a plurality of tabs spaced from each other, and the tabs extend from the platform; and
the platform and the tabs cooperate with each other to define a pocket to receive a central body of the sensor apparatus.

15. The valve assembly of claim 14 wherein the retaining portion of the sensor apparatus includes at least one lip that protrudes from the central body, and the tabs engage the lip to secure the central body in the pocket.

16. The valve assembly of claim 15 wherein:
the at least one lip is further defined as a plurality of lips spaced from each other and each of the lips protrude from the central body; and
more than one of the tabs engage one of the lips, and one of the tabs engage another one of the lips.

17. The valve assembly of claim 1 wherein:
the ring includes a platform spaced from a first end of the cap, and the platform supports the sensor apparatus;
the retaining portion of the ring includes a plurality of fingers that extend from the platform;
one pair of the fingers cooperate to define a window and another pair of the fingers cooperate to define another window;
the platform includes a post; and
the platform, the post and the fingers cooperate with each other to define a pocket to receive a central body of the sensor apparatus.

18. The valve assembly of claim 17 wherein:
the retaining portion of the sensor apparatus includes a plurality of tabs spaced from each other, and the tabs protrude from the central body, and the tabs engage the respective windows to secure the central body in the pocket; and the central body defines a recess to receive the post.

19. The valve assembly of claim 1 wherein the retaining portion of the sensor apparatus and the retaining portion of the ring provide a quick-connect.

\* \* \* \* \*